Feb. 12, 1929.
H. M. ROSS
1,701,934
CLUTCH
Filed June 7, 1924
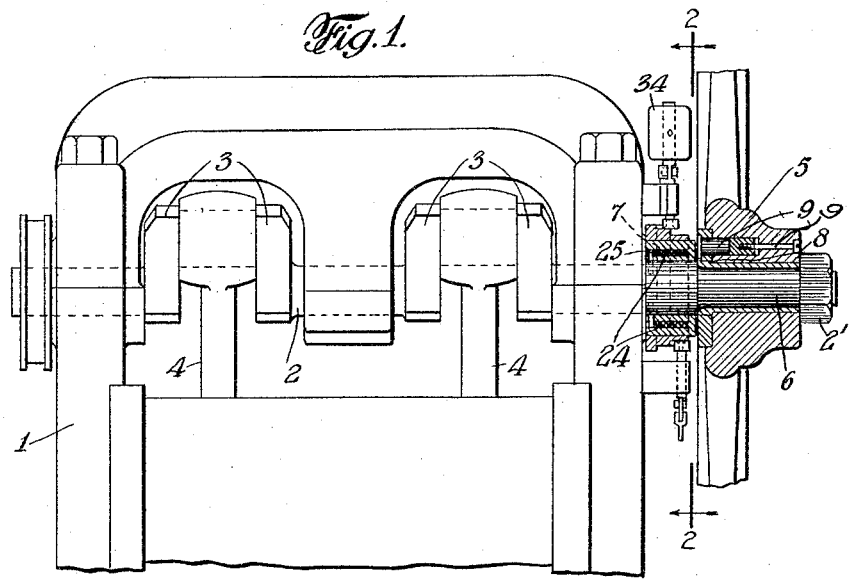
Fig. 1.
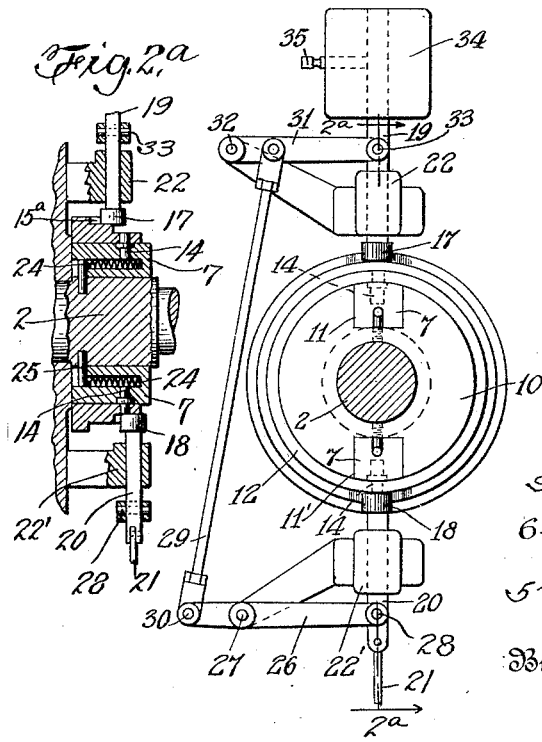
Fig. 2.
Fig. 2a.
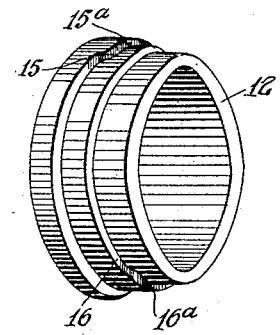
Fig. 3.
Fig. 4.
Inventor
Hugh M. Ross
By his Attorneys
Kenyon & Kenyon Patented Feb. 12, 1929.

1,701,934

UNITED STATES PATENT OFFICE.

HUGH M. ROSS, OF WOODHAVEN, NEW YORK, ASSIGNOR TO ADRIANCE MACHINE WORKS, INC., OF BROOKLYN, NEW YORK, A CORPORATION OF NEW YORK.

CLUTCH.

Application filed June 7, 1924. Serial No. 718,444.

My invention relates to clutches and more particularly to clutches of the type which are automatically rendered inoperative so as to disconnect the driven from the driving part after each operation of the machine to which the clutch is applied, the clutch thereafter remaining inoperative until it is again rendered operative by the operator. In the meantime the operator may easily and safely place into position in the machine the material to be operated upon.

The principal object of the invention is to provide a strong, efficient and readily operable clutch suitable for transmission of considerable amounts of power, for example, for connecting to its driving means a punch press suitable for heavy work.

Other objects, features and advantages of the invention will appear more fully in the following detailed description and appended claims.

The accompanying drawing forming a part of this application illustrates one embodiment of the invention.

In the drawing,

Fig. 1 is a view partly in elevation and partly in section of a part of a punch press embodying my invention.

Fig. 2 is a view taken on line 2—2 of Fig. 1 but on a larger scale;

Fig. 2ª is a section taken on the line 2ª—2ª of Fig. 2;

Fig. 3 is a perspective view of a cam ring forming a part of the clutch; and

Fig. 4 is a perspective view of the clutch member 8.

The machine as shown comprises a frame 1 in the upper portion of which is mounted a horizontal shaft 2 formed with cranks 3 to the outer portions of which are pivoted connecting rods 4 to the lower portions of which the movable punch members (not shown) are connected for up and down movement. A power wheel 5 driven from any suitable source is mounted on the extension 6 of shaft 2 so as to rotate freely thereon except when clutched thereto. The power wheel is held against movement longitudinally of the shaft between a shoulder on the shaft and the nut 2' threaded on the outer end of the shaft.

The clutch as shown includes a plurality of bolts 7 which are supported and fit in slideways upon the shaft 2 so as to be movable longitudinally and parallel to the axis of the shaft 2 towards and away from the coacting clutch member 8 secured to one of the sides of the hub of the power or driving wheel 5. The slideways for the clutch bolts are preferably rectangular in cross section, as shown, and the bolts are accordingly very strong transversely and secure a firm engagement against the flat side walls of the slideways. As shown, the clutch member 8 is in the form of a vertical ring which is secured to the hub of the wheel 5 coaxially of the shaft 2 by means of headed pins 9 and screws 9', the shanks of the pins 9 passing through the ring 8 and into the hub of the wheel 5 while the screws 9' pass into the hub from the opposite side and are screwed into the shanks of the pins 9. The clutch member 8 is provided with recesses against the walls of which the outer end portions of the clutch bolts 7 engage when in operative or clutching position.

In order not to weaken the driving shaft 2, the slideways for the bolts 7 are formed in an enlargement or flange 10 upon the shaft 2, the slideways being cut through the outer portions of this flange so as to extend in a direction parallel to the axis of the shaft 2, as shown at 11 and 11' in Fig. 2. The recesses or slideways thus formed preferably extend no further inward than the periphery of the body portion of the shaft 2 so as not to weaken the shaft. The flange or enlargement 10 may be so proportioned that it will have the requisite strength and will also afford slideways of sufficiently large cross section to support clutch bolts of suitable strength for the transmission of the necessary amount of power. Enlargement 10, as shown, is arranged to bear at one side upon the frame 1 of the machine and at its opposite side to form an abutment preventing inward movement of the driving wheel 5 upon the shaft 2. While two clutch bolts at diametrically opposite positions in the flange 10 are shown, a greater number thereof, arranged equally distant about the axis of the shaft, may be employed. In fact a single clutch bolt may be employed but not with as much satisfaction as a plurality because of the better application of the power to the shaft obtained with the latter.

To cause the clutch bolts 7 to move in unison into and out of engagement with coacting clutch member 8, these bolts are connected, as shown, by ring or sleeve 12 fitted upon the periphery of the flange or enlargement 10 and against the sides of the clutch bolts so as to be slidable longitudinally of the shaft. The ring or sleeve 12 is connected with the clutch bolts by any suitable means, such as the pins 14, the bolts having outer faces conforming to and contacting the inner face of the ring.

The ring or sleeve 12, as shown, is formed with a plurality of cams 15, 16 against which abutments 17 and 18 respectively are arranged to bear to effect movement of the ring 12 together with the clutch bolts 7 away from the clutch member 8 upon the rotation of the ring. The abutments, as shown, are in the form of rollers mounted upon vertical rods 19 and 20 respectively. The rod 19 extends upwardly from the roller 17 and is guided for vertical movement in a fixed bearing 22. The rod 20 extends downwardly from the roller 18 and is guided for vertical movement in a fixed bearing 22'. The rods 19 and 20, as shown, are in axial alinement with their axes intersecting the axis of the shaft 2. The projecting portions $15^a$ and $16^a$ of the cams 15 and 16 respectively, with which the rollers 17 and 18 coact to effect movement of the cam ring 12, are also arranged at diametrically opposite positions upon the said ring; so that the ring is simultaneously acted upon by the rollers 17 and 18 at positions diametrically opposite each other, or equidistant about the periphery of the ring; and there is accordingly no unbalanced force tending to cause a tilting strain or binding of the ring upon the enlargement 10.

Springs 24 tend to move the clutch bolts longitudinally in the slideways into clutching position. These springs as shown are arranged in openings in the clutch bolts and bear at their opposite ends upon the clutch bolts and upon pins 25 fastened to the shaft 2 and extending through longitudinal slots in the clutch bolts. In order to release the rollers 17 and 18 from the respective cams and permit engagement of the outer ends of the clutch bolts with the coacting clutch member 8, suitable means are provided for moving the rods 19 and 20 outwardly with respect to the axis of the shaft 2. As shown, the rod 20 has connected thereto a link or rod 21 which may be connected to any suitable operating member, such as a treadle (not shown), to draw the same downwardly to effect the disengagement of the roller 18 from the cam 16. To effect the simultaneous disengagement of the roller 17 from the cam 15 I provide, as shown, a lever 26 pivoted at 27 upon a fixed bracket or support and pivotally connected at one end to the rod 20, as shown at 28, and at the opposite end to a link 29, as shown at 30. The link 29 is also pivoted to lever 31. This lever is pivoted at 32 to a fixed bracket or other support and is pivoted at its opposite end, as shown at 33, to the rod 19. The link 29 is connected to the outer end of the lever 26 and is connected to the lever 31 intermediate its pivotal support and its connection to the rod 19. As a result a downward movement of the connection 21 effects upward movement of the lever 31 and rod 19 and consequently disengagement of the roller 17 from the cam 15. Similarly movement of the roller 18 inwardly into engagement with the cam 16 is accompanied by simultaneous inward or downward movement of the roller 17 into engagement with cam 15. Suitable means are provided to hold the rollers 17 and 18 in their inner or operative positions. As shown, a weight 34 secured to the rod 19, as by screw 35, tends to yieldingly hold the rollers 17 and 18 in their inner or operative positions.

In operation the rollers 17 and 18 are normally in engagement with the portions $15^a$ and $16^a$ of the cams 15 and 16 respectively, and the ring 12 is held in such position that the clutch bolts 7 are retracted or out of operative position with respect to the clutch member 8 upon the driving wheel 5. The material to be operated upon having been placed in position in the machine, the operator depresses the treadle rod 21 moving the rollers 17 and 18 outwardly out of engagement with the cams 15 and 16. The springs 24 thereupon automatically move the clutch bolts 7 into engagement with the clutch member 8 upon the driving wheel 5. The shaft 2 is now clutched to and driven by the power wheel 5. The operator immediately releases the treadle rod; whereupon, under the influence of the weight 34, the rollers 17 and 18 tend to move inwardly to their operative positions. The elevations $15^a$ and $16^a$ on the cams are of comparatively short length and the rollers 17 and 18 are accordingly permitted to move to their inner positions very shortly after the beginning of the rotation of the shaft 2 and the ring 12, which is non-rotatably mounted upon the shaft. The shaft 2 moves substantially a complete rotation (during which the machine performs the desired operation), whereupon the elevations $15^a$ and $16^a$ upon the cams 15 and 16 come respectively into engagement with the abutment rollers 17 and 18; so that, as the rotation of the shaft 2 and ring 12 continue, the ring 12 together with the clutch bolts 7 are forced by the cam action between said abutment rollers and cams longitudinally of the shaft away from and out of operative relation to the clutch member 8 upon the driving wheel 5. The rotation of the shaft 2 and also of the ring 12 now stops; so that the clutch bolts are retained in inoperative position until the treadle rod 21 is again depressed to move the abutment rollers 17 and 18 out of operative position.

While I have shown one embodiment of my invention, it is to be understood that I am not limited to the details shown and described.

Having thus described my invention, what I claim as new and desire to secure by Letters Patent of the United States is:—

1. The combination of a shaft provided with an enlargement having equi-distant slideways rectangular in cross section extending longitudinally of the shaft, a device mounted to rotate with respect to said shaft, and clutching means between said shaft and device, said clutching means including a plurality of clutch bolts carried by said shaft and fitting in said slideways respectively for movement longitudinally thereof, a coacting clutch member on said device arranged to be engaged by adjacent ends of the bolts, a connecting ring secured to said bolts, said bolts having outer faces conforming to and contacting the inner face of said ring and said ring being provided with a plurality of cams, abutments engaging the respective cams at a plurality of equidistant points about the axis of the ring, means for moving one of said abutments out of operative relation to said cams, means connected to said abutment for causing a second abutment to be moved out of operative relation to said cams upon movement of said first abutment, and means connected to one of said abutments for moving said abutments into operative relation to said cams.

2. The combination of a shaft provided with an enlargement having equidistant slideways rectangular in cross section extending longitudinally of the shaft, a device mounted to rotate with respect to said shaft, and clutching means between said shaft and device, said clutching means including a plurality of clutch bolts carried by said shaft and fitting in said slideways respectively for movement longitudinally thereof, a coacting clutch member on said device arranged to be engaged by adjacent ends of the bolts, a connecting ring secured to said bolts, said bolts having outer faces conforming to and contacting the inner face of said ring and said ring being provided with a plurality of cams, a plurality of abutments mounted upon aligned vertically movable members spaced equidistant about the axis of said ring, means connected to one of said members for moving the abutment mounted thereon out of operative relation to said cams, means for operatively connecting said member to the other thereof whereby movement of said first member away from said cams causes corresponding movement of the second thereof, and means associated with said second member for moving said abutments into operative relation to said cams.

In testimony whereof, I have signed my name to this specification.

HUGH M. ROSS.